US008001456B2

(12) United States Patent
McElroy et al.

(10) Patent No.: US 8,001,456 B2
(45) Date of Patent: Aug. 16, 2011

(54) METHODS FOR MAINTAINING SEPARATION BETWEEN MARKUP AND DATA AT A CLIENT

(75) Inventors: Thomas F. McElroy, Durham, NC (US); Yongcheng Li, Cary, NC (US); Roderick C. Henderson, Apex, NC (US); John J. Ponzo, Hawthorne, NY (US); Laurent D. Hasson, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1406 days.

(21) Appl. No.: 11/067,963

(22) Filed: Feb. 28, 2005

(65) Prior Publication Data

US 2006/0195779 A1    Aug. 31, 2006

(51) Int. Cl.
G06F 17/00    (2006.01)
(52) U.S. Cl. ...................................................... 715/205
(58) Field of Classification Search .................. 715/500, 715/501.1, 513, 200, 234, 205, 255; 709/203
See application file for complete search history.

(56) References Cited

U.S. PATENT DOCUMENTS

| | | | | |
|---|---|---|---|---|
| 5,553,216 A | * | 9/1996 | Yoshioka et al. ............. 715/515 |
| 5,873,100 A | * | 2/1999 | Adams et al. ........................ 1/1 |
| 5,956,709 A | * | 9/1999 | Xue ...................................... 1/1 |
| 5,983,247 A | * | 11/1999 | Yamanaka et al. ............ 715/209 |
| 5,987,480 A | | 11/1999 | Donohue et al. |
| 6,065,012 A | * | 5/2000 | Balsara et al. ................ 707/102 |
| 6,067,565 A | | 5/2000 | Horvitz |
| 6,122,661 A | * | 9/2000 | Stedman et al. .............. 709/217 |
| 6,199,107 B1 | | 3/2001 | Dujari |
| 6,275,496 B1 | * | 8/2001 | Burns et al. ..................... 370/429 |
| 6,278,449 B1 | | 8/2001 | Sugiarto et al. |
| 6,327,608 B1 | | 12/2001 | Dillingham |
| 6,327,628 B1 | | 12/2001 | Anuff et al. |
| 6,349,132 B1 | * | 2/2002 | Wesemann et al. ........ 379/88.17 |
| 6,366,947 B1 | | 4/2002 | Kavner |
| 6,397,217 B1 | | 5/2002 | Melbin |
| 6,442,651 B2 | | 8/2002 | Crow et al. |
| 6,539,372 B1 | * | 3/2003 | Casey et al. ....................... 707/3 |
| 6,564,251 B2 | | 5/2003 | Katariya et al. |
| 6,622,168 B1 | | 9/2003 | Datta |
| 6,647,396 B2 | * | 11/2003 | Parnell et al. ................. 707/102 |
| 6,674,450 B1 | * | 1/2004 | Toub et al. ..................... 715/749 |
| 6,822,663 B2 | | 11/2004 | Wang et al. |
| 6,842,755 B2 | * | 1/2005 | Maslov ............................ 707/10 |
| 6,950,831 B2 | * | 9/2005 | Haley .......................... 707/104.1 |
| 7,003,566 B2 | | 2/2006 | Codella et al. |
| 7,207,000 B1 | * | 4/2007 | Shen et al. ..................... 715/513 |
| 7,231,496 B2 | | 6/2007 | Curtis |
| 7,263,691 B2 | * | 8/2007 | Vehkomaki ................... 717/140 |

(Continued)

OTHER PUBLICATIONS

Chuang et al., Tree-Structured Template Generation for Web Pages, ACM 2004, pp. 1-7.*

(Continued)

Primary Examiner — Cong-Lac Huynh
(74) Attorney, Agent, or Firm — Law Office of Jim Boice

(57) ABSTRACT

Methods, systems and computer program products are provided for communicating data between a web application running on a server and a browser running on a client in a network environment. Information is requested at the client from the server. The requested information is received at the client. The requested information is separated into a data portion and a markup portion.

11 Claims, 7 Drawing Sheets

U.S. PATENT DOCUMENTS

| | | | |
|---|---|---|---|
| 7,287,227 B2* | 10/2007 | Ries et al. | 715/741 |
| 7,500,181 B2* | 3/2009 | Kim et al. | 715/234 |
| 7,516,196 B1* | 4/2009 | Madan et al. | 709/219 |
| 7,720,788 B2* | 5/2010 | Carpenter | 706/62 |
| 2001/0033284 A1 | 10/2001 | Chan | |
| 2001/0034771 A1 | 10/2001 | Hutsch et al. | |
| 2001/0051927 A1 | 12/2001 | London et al. | |
| 2001/0056474 A1* | 12/2001 | Arai | 709/217 |
| 2002/0010761 A1 | 1/2002 | Carneal et al. | |
| 2002/0023110 A1* | 2/2002 | Fortin et al. | 707/513 |
| 2002/0065932 A1 | 5/2002 | Kobayashi et al. | |
| 2002/0065933 A1 | 5/2002 | Kobayashi et al. | |
| 2002/0069255 A1 | 6/2002 | Dinovo | |
| 2002/0078165 A1 | 6/2002 | Genty et al. | |
| 2002/0087690 A1 | 7/2002 | Hepper et al. | |
| 2002/0091763 A1 | 7/2002 | Shah et al. | |
| 2002/0095459 A1 | 7/2002 | Laux et al. | |
| 2002/0111848 A1 | 8/2002 | White | |
| 2002/0120648 A1* | 8/2002 | Ball et al. | 707/511 |
| 2002/0123957 A1 | 9/2002 | Notarius et al. | |
| 2002/0143868 A1* | 10/2002 | Challenger et al. | 709/203 |
| 2002/0169852 A1 | 11/2002 | Schaeck | |
| 2002/0188631 A1 | 12/2002 | Tiemann et al. | |
| 2003/0005053 A1 | 1/2003 | Novaes | |
| 2003/0007009 A1* | 1/2003 | Haley | 345/805 |
| 2003/0009533 A1 | 1/2003 | Shuster | |
| 2003/0009538 A1 | 1/2003 | Shah et al. | |
| 2003/0055915 A1 | 3/2003 | Ngo | |
| 2003/0074634 A1* | 4/2003 | Emmelmann | 715/513 |
| 2003/0105857 A1 | 6/2003 | Kamen et al. | |
| 2003/0163517 A1 | 8/2003 | Assaf et al. | |
| 2003/0177175 A1 | 9/2003 | Worley et al. | |
| 2003/0212760 A1 | 11/2003 | Chen et al. | |
| 2003/0221184 A1* | 11/2003 | Gunjal et al. | 717/118 |
| 2004/0003343 A1* | 1/2004 | Liao et al. | 715/501.1 |
| 2004/0010753 A1* | 1/2004 | Salter et al. | 715/513 |
| 2004/0021679 A1* | 2/2004 | Chapman et al. | 345/700 |
| 2004/0078362 A1* | 4/2004 | Kim et al. | 707/3 |
| 2004/0098467 A1 | 5/2004 | Dewey et al. | |
| 2004/0163088 A1* | 8/2004 | Frender et al. | 719/313 |
| 2004/0177319 A1* | 9/2004 | Horn | 715/501.1 |
| 2004/0199876 A1* | 10/2004 | Ethier et al. | 715/523 |
| 2004/0205488 A1* | 10/2004 | Fry | 715/501.1 |
| 2004/0205555 A1 | 10/2004 | Hind et al. | |
| 2004/0217985 A9* | 11/2004 | Ries et al. | 345/740 |
| 2004/0243928 A1 | 12/2004 | Hesmer et al. | |
| 2004/0268225 A1* | 12/2004 | Walsh et al. | 715/501.1 |
| 2004/0268231 A1* | 12/2004 | Tunning | 715/513 |
| 2005/0018152 A1 | 1/2005 | Ting et al. | |
| 2005/0024355 A1* | 2/2005 | Yagi | 345/204 |
| 2005/0050021 A1 | 3/2005 | Timmons | |
| 2005/0060498 A1 | 3/2005 | Curtis | |
| 2005/0102612 A1* | 5/2005 | Allan et al. | 715/513 |
| 2005/0114757 A1* | 5/2005 | Sahota et al. | 715/501.1 |
| 2005/0198042 A1* | 9/2005 | Davis | 707/10 |
| 2005/0198365 A1* | 9/2005 | Wei | 709/237 |
| 2005/0223310 A1 | 10/2005 | Wachholz-Prill et al. | |
| 2005/0240657 A1* | 10/2005 | Yamaguchi et al. | 709/217 |
| 2005/0240869 A1* | 10/2005 | Leetaru et al. | 715/530 |
| 2007/0006075 A1* | 1/2007 | Lection et al. | 715/530 |
| 2007/0016909 A1* | 1/2007 | Gautier | 719/310 |
| 2007/0250572 A1* | 10/2007 | Paila et al. | 709/204 |
| 2007/0288695 A1* | 12/2007 | Artobello et al. | 711/130 |
| 2008/0134014 A1* | 6/2008 | Hind et al. | 715/205 |
| 2008/0140774 A1* | 6/2008 | Johnson | 709/203 |
| 2009/0265705 A1* | 10/2009 | Wei | 717/176 |
| 2009/0268672 A1* | 10/2009 | Kline et al. | 370/328 |
| 2010/0023541 A1* | 1/2010 | Cosic | 707/101 |

OTHER PUBLICATIONS

Ma et al., Extracting Unstructed Data from Template Generated Web Documents, ACM 2003, pp. 512-515.*

Al-Darwish, PageGen: an effective scheme for dyanmic generation of web pages, Google Mar. 2003, pp. 651-662.*

Anton et al., Web Caching for Database Applications with Oracle Web Cache, ACM 2002, pp. 594-599.*

Gupta et al., DOM-based Content Extraction of HTML Documents, ACM 2003, pp. 207-214.*

Neff et al., The Talent System: TEXTRACT Architexture and Data Model, Google 2002, pp. 1-8.*

IBM, *FacesClient Components, Part 1: Portlet programming with FacesClient Components*, Nov. 23, 2004, updated Feb. 4, 2005 (www-106.ibm.com/developerworks/web/library/wa-facescomp1/).

IBM, *FacesClient Components, Part 2: Use FacesClient Components in a portal environment*, Jan. 5, 2005 (http://www-128.ibm.com/developerworks/web/library/wa-facescomp2/).

IBM, *FacesClient Components, Part 4: Develop and deploy rich clients on the portal*, Nov. 24, 2004 (http://www-128.ibm.com/developerworks/web/library/i-selfserv4/).

IBM, *FacesClient Components Developer's Guide*, © Copyright 2003, 2004 International Business Machines Coporation (http://www-128.ibm.com/developerworks/websphere/library/techarticles/0411_hasson/0411_hasson.html).

www.apache.org.

U.S. Appl. No. 10/464,910 entitled, "Methods, Systems and Computer Program Products for Portlet Aggregation by Client Applications on a Client Side of a Client/Server Environment," filed Jun. 19, 2003.

U.S. Appl. No. 10/838,837 entitled, "Methods, Systems and Computer Program Products for Client Side Prefetching and Caching of Portlets," filed May 4, 2004.

U.S. Appl. No. 10/464,910: Non-Final Rejection, Dec. 11, 2006, pp. 1-8.

U.S. Appl. No. 10/464,910: Response after Non-Final Action, Jan. 31, 2007, pp. 1-18.

U.S. Appl. No. 10/464,910: Final Rejection, Apr. 2, 2007, pp. 1-9.

U.S. Appl. No. 10/464,910: Appeal Brief, Jan. 28, 2008, pp. 1-24.

U.S. Appl. No. 10/464,910: Examiner's Answer to Appeal Brief, Apr. 14, 2008, pp. 1-10.

U.S. Appl. No. 10/464,910: BPAI Decision, Feb. 23, 2010, pp. 1-13.

U.S. Appl. No. 10/838,837: Non-Final Rejection, Dec. 26, 2007, pp. 1-16.

U.S. Appl. No. 10/838,837: Response after Non-Final Action, Mar. 31, 2008, pp. 1-12.

U.S. Appl. No. 10/838,837: Final Rejection, Jul. 7, 2008, pp. 1-13.

U.S. Appl. No. 10/838,837: Non-Final Rejection, Dec. 5, 2008, pp. 1-10.

U.S. Appl. No. 10/838,837: Response after Non-Final Action, Apr. 2, 2009, pp. 1-12.

U.S. Appl. No. 10/838,837: Notice of Allowance, Jul. 13, 2009, pp. 1-13.

Atomica Legal "Atomica Enterprise Technology" 3 pages, Accessed Feb. 14, 2003, Copyright 2002.

IBM "WebSphere Portal Server whitepaper—part 9: Guide to WebSphere Portal" 8 pages, Accessed Feb. 14, 2003.

IBM "WebSphere Portal for Multiplatforms" 2 pages, Accessed May 14, 2003.

Hesmer S: "Portlet Development Guide. Working with the Portlet API 1.1", Apr. 2, 2002, XP002267927, p. 6-p. 13, p. 47-48.

Li Fan et al: "Web Prefetching Between Low-bandwidth Clients and Proxies: Potential and Performance", Performance Evaluation Review, Association for Comuting Machinery, New York, New York, US, vol. 27, No. 1, May 1, 1999, p. 178-187, XPO02157516, ISSN: 0163-5999, the whole doc.

IBM China IP Law, Information Disclosure Statement, Mar. 21, 2008, 1 page, China.

* cited by examiner

FIG. 4A

<Page Title> IBM WebShpere Portal
File  Edit  View  Favorites  Tools  Help

Branch Banking ▶
OBF Teller                                                                    — 410

Personal Information | Customer Sessions | Customer Search  — 415, 420

Customer Identification: *Demo1*
Contact Info
Sr. John McDonnell    ☎ 34934010021(H)
Balmes 31             ☎ 34934010005(O)
Barcelona, 08029      ✉ JMcDonnell@cba.com
Spain
Single Customer Sessions (End ->) ⊗

| Customer Name | ID |
|---|---|
| John McDonnell | Demo1 |

◀◀ ◀  Page 1 of 1  ▶ ▶▶

Search for a new customer
Search by: Customer ID ▶
[        ]  Search ⊕
                                                                — 430

Global Position                                      — 425

| Banking | Credit Card | Fund | Loan | Avail. Bal. | Currency |
|---|---|---|---|---|---|
| 1002103259 | | | | 900.00 | USD |
| 1021163220 | | | | 2,990.00 | EUR |
| 1008102435 | | | | 4,310.00 | EUR |

| Acct# | Balance |
|---|---|
| 1002103259 | 900.00 |
| 1021163220 | 2,990.00 |
| 1008102435 | 4,310.00 |

◀◀ ◀ Page 1 of 2 ▶ ▶▶    Jump to page: [  ]

Banking Accounts (USD)
☐ 1002103259
☐ 1021163220
☐ 1008102435
☐ 1019153220

Teller
  Deposit
  Withdraw
  Transfer

Please select a teller operation from the left side menu.

<Page Title> IBM WebShpere Portal

File  Edit  View  Favorites  Tools  Help

Branch Banking ▶

OBF Teller

Personal Information — 410'

Customer Identification: Demo2

Contact Info

Ms. Diane Swan  ☎ 8132027787(H)
3030 Miami Road  ☎ 81333316590(O)
Chicago, 61008  ✉ dswan@odc.com
USA
Married

Global Position — 425'

| Banking | Credit Card | Fund | Loan | ▲ |
|---|---|---|---|---|
| Acct# | Balance | Avail. Bal. | Currency | |
| 2002303157 | 2,500.00 | 2,500.00 | USD | |
| 2029374009 | 1,000.00 | 1,000.00 | EUR | |
| 2023125258 | 400.00 | 400.00 | USD | |

◀◀ Page 1 of 2 ▶▶  Jump to page: ☐

Banking Accounts (USD)

2500
1380
1200
400

☐ 2002303157
☐ 2029374009
☐ 2023125258
☐ 2010362454

Teller

Deposit
Withdraw
Transfer

Customer Sessions — 415'

| Customer Name | ID |
|---|---|
| John McDonnell | Demo1 |
| Diane Swan | Demo2 |

◀▼ Page 1 of 1 ▲▶

Customer Search — 420'

Search for a new customer

Search by: Customer ID ▶

☐  Search ⊙

430'

Please select a teller operation from the left side menu.

400'

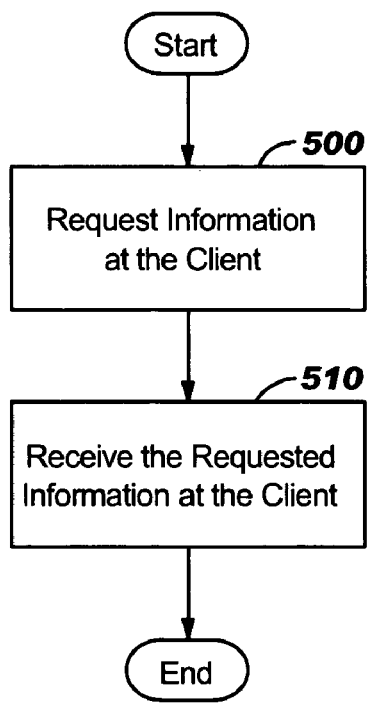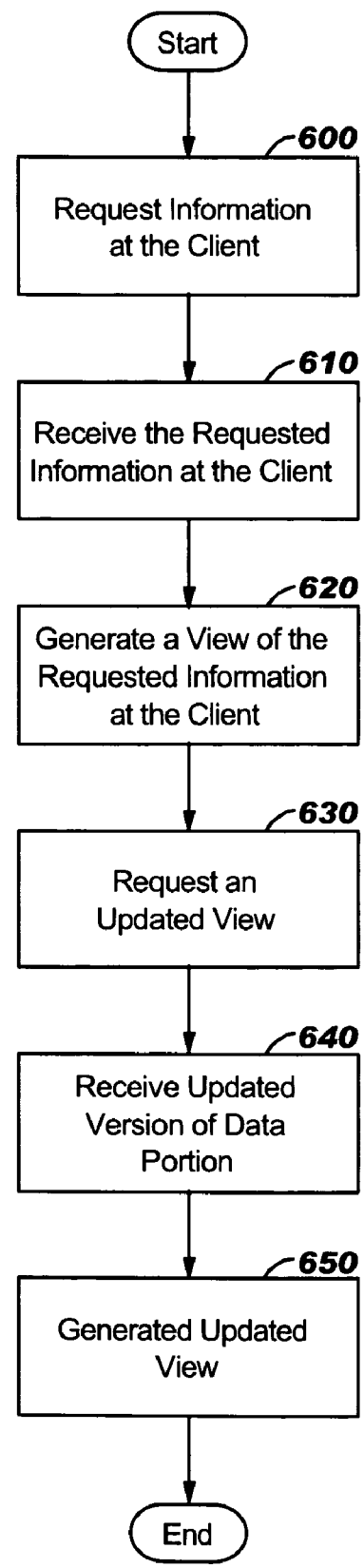

METHODS FOR MAINTAINING SEPARATION BETWEEN MARKUP AND DATA AT A CLIENT

FIELD OF THE INVENTION

This invention relates to methods, systems, and computer program products for processing information, and more particularly, to methods, systems, and computer program products for processing information in a networked computer environment.

BACKGROUND OF THE INVENTION

With the increase in the popularity of the "world wide web"(www), the use of so-called "web browsers" or "browsers" has become more common. For example, a web browser available from Netscape, Inc., known as Netscape Navigator, can provide a convenient way to operate applications and view data via the web.

Some of the applications available via the web can provide a high level of interaction with the user, as these applications may be written in native languages, such as C or Java. In particular, applications written in these types of native languages can be specifically written to require intensive user interaction. As the level of interaction between the user and the application increases, so can the communication between the web browser and the application. This increase in communication can cause enough requests and associated responses that the available network bandwidth may be affected.

In addition to the problems outlined above regarding generic applications, a new type of environment, commonly referred to as the "emerging web desktop," may cause even greater problems similar to those discussed above. In particular, the emerging web desktop can provide users with access to what is commonly referred to as a portal. The portal can allow a user to access multiple applications through a single screen (displayed by the web browser). For example, some portals allow users to access applications that can show disparate data, such as banking information, weather, sports, stock information, or the like, to a user on a single screen. Much of the processing needed to manage the portal (such as administration, customization, and switching) can place even greater demands on the bandwidth available between the browser and the application. In particular, since most of the processing is performed at the applications server, a lot of information is communicated between the server and the browser, which may consume a lot of bandwidth.

Some of the problems arising due to increasing use of portals may be addressed by, for example, separating a file into its dynamic data components, i.e., the components of the data that change, and its static components, i.e., the components of data that do not change, before transmitting the data from the server to the client. The dynamic and static data may be stored separately on the client. The static data may be, for example, fields such as name, address, telephone number and the like, which would remain the same. The dynamic data, on the other hand, may be, for example, the information in these fields such as the user's name, address and telephone number, which would change based on the user. Methods, systems and computer program products that implement such a separation are discussed in detail in United States Patent Publication Nos. US 2003/0177175 A1, US 2002/0069255 A1, US 2003/055915 A1, US 2002/0188631 A1, US 2001/0033284 A1 and US 2003/0163517 A1, the disclosures of which are incorporated herein by reference as if set forth in their entirety.

However, separate storage of static and dynamic data does not address some of the issues discussed above that can arise when using a web browser to access applications and/or data via the web.

SUMMARY OF EMBODIMENTS OF THE INVENTION

Some embodiments of the present invention provide methods, systems and computer program for of communicating data between a web application running on a server and a browser running on a client in a network environment. Information is requested at the client from the server. The requested information is received at the client. The requested information is separated into a data portion and a markup portion.

In further embodiments of the present invention, a view of the requested information may be generated at the client based on the received information without any further interaction from the server. In certain embodiments of the present invention, the generated view may include a web page.

In still further embodiments of the present invention, an updated view of the web page may be requested at the client. An updated version of the data portion of the information may be received at the client without receiving an updated version of the markup portion of the information. An updated view of the web page may be generated based on the updated version of the data portion of the information.

Some embodiments of the present invention provide methods systems and computer program products for transmitting a web page from a server to a client. A request is received, at the server, for a web page from the client. A data set is determined responsive to the request for the web page. The data set includes raw data to be included on the requested web page at the client. A data model is created for the determined data set at the server. The data model is associated with the determined data set. One or more controls associated with the data model are provided. The one or more controls are used to manage graphical and textual presentation of the data model at the client. The data set, the data model and the one or more controls are transmitted to the client. Each of the data set, data model and one or more controls are kept separate, so as to allow a view of the requested web page to be generated at the client based on the transmitted data set, data model and one or more controls.

In further embodiments of the present invention, JavaScript library (JSL) artifacts may be generated based on the data set, the data model and the one or more controls. The stream of JavaScript and HTML may be transmitted to the client. The stream of JavaScript and HTML may be received at the client. The requested web page may be generated at the client based on the received stream of JavaScript and HTML.

In still further embodiments of the present invention, a request for an updated version of the web page may be received at the client. An updated data set may be received at the client responsive to the request for the updated version of the web page. The updated data set may be received without receiving an updated data model or updated one or more controls. The updated version of the web page may be generated based on the received updated version of the data set at the client.

Some embodiments of the present invention provide methods, systems and computer program products for generating a web page at a client device. Information associated with the web page is received responsive to a request for the web page at the client device, from a server. The information is separated into a data portion and a markup portion.

In further embodiments of the present invention, the received information may include JavaScript and/or HTML. In certain embodiments of the present invention, the markup portion comprises a client-side representation of the model, view and controller elements associated with the server.

BRIEF DESCRIPTION THE DRAWINGS

FIGS. 4A and 4B are screen shots of a graphical user interface (GUI) that may be generated according to some embodiments of the present invention.

FIGS. 5 through 9 are flowcharts illustrating operations according to various embodiments of the present invention.

DETAILED DESCRIPTION OF EMBODIMENTS OF THE INVENTION

Figure 1:
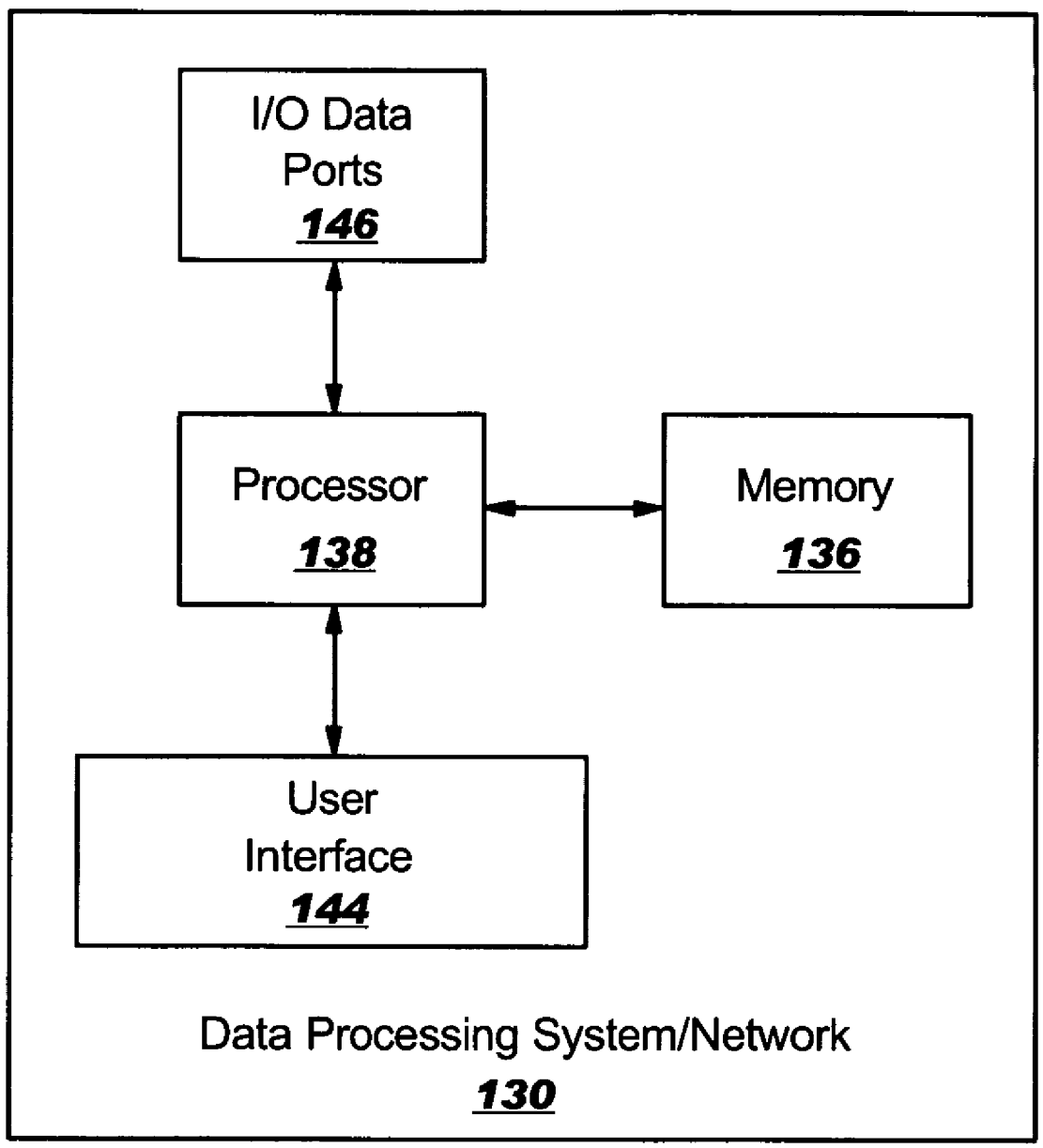
FIG. 1 is a block diagram of a data processing system suitable for use in some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated selectivity features, integers, steps, operations, elements, and/or components, but do not preclude the presence or addition of one or more other selectivity features, integers, steps, operations, elements, components, and/or groups thereof. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described below with reference to block diagrams and/or flowchart illustrations of methods, systems and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

As used herein, the term "Web site" can include a related collection of files that includes a beginning file called a home page. From the home page, a visitor can access other files and applications at the Web site. A large Web site may utilize a number of servers, which may or may not be different and may or may not be geographically-dispersed. For example, the Web site of the International Business Machines Corporation (www.ibm.com) consists of thousands of Web pages and files dispersed over multiple Web servers in locations world-wide.

Some embodiments according to the invention can operate in a logically separated client side/server side computing environment, sometimes referred to hereinafter as a client/server environment. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server. Examples of clients include browsers such as Netscape Navigator® (America Online, Inc., Dulles, Va.) and Internet Explorer®V (Microsoft Corporation, Redmond, Wash.). Browsers typically provide a graphical user interface for retrieving and viewing web pages, web portals, applications, and other resources served by Web servers.

A server can be a program that responds to the requests from the client. Some examples of servers are International Business Machines Corporation's family of Lotus Domino® servers, the Apache server (available from http://www.apache.org), International Business Machines Corporation's WebSphere Application Server and Microsoft's Internet Information Server (IIS) (Microsoft Corporation, Redmond, Wash.).

The clients and servers can communicate using a standard communications mode, such as Hypertext Transport Protocol (HTTP). According to the HTTP request—response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Although the present invention is described herein with reference to web pages, web servers, etc., it will be understood that the present invention can be practiced with any computer displayable documents having information. Furthermore, the present invention is not limited to the web. The term "network" includes the distribution of information among systems that communicate with each other over a communication link, such as over the Internet, an intranet, a wireless network, or any other type of communications system.

As is known to those skilled in this art, a Web page is conventionally formatted via a standard page description language such as HyperText Markup Language (HTML), which typically contains text and can reference graphics, sound, animation, and video data. HTML provides for basic document formatting and allows a Web content provider to specify anchors or hypertext links (typically manifested as highlighted text) to other servers. When a user selects (i.e., activates) a particular hypertext link, a browser running on the user's client device reads and interprets an address, called a Uniform Resource Locator (URL) associated with the hypertext link, connects the browser with a Web server at that address, and makes a request (e.g., an HTTP request) for the file identified in the hypertext link. The Web server then sends the requested file to the client, which interprets and renders the Web page for display.

A web browser can be used to view what is sometimes referred to as a web portal (or portal). As understood by those skilled in the art, the web portals can operate according to the same communications protocols described above in reference to clients and servers where the client is a web browser that views portal pages and the server is sometimes referred to as an portal applications server that serves requested information to the web browser.

A portal can be a single presentation (or view) of information from multiple sources, sometimes referred to as an aggregation of information. Portals often include information such as: calendars and to-do lists, discussion groups, announcements and reports, news, stock quotes, searches, e-mail and address books, weather, maps, shopping, and the like, all of which may be provided to the portal by different sources and/or applications.

Much of the information provided by the portal can be customized by the user. For example, some portals, such as, My Lycos®, can be customized to display the weather forecast in a user's area or display sports scores for the user's favorite teams. Moreover, the customization can include the look and feel of portal itself. For example, some portals can be customized to be displayed using particular skins or screen themes.

A portal may also use profiling to present and customize content that interests the user and/or to provide accurate demographic data for prospective advertisers and to help them match ad content with likely sales prospects. Accordingly, portals, and recently other web providers such as news services, frequently request that the user fill out a profile form. The profile form may request, for example, the user's name, gender, age, address, income bracket, employment, recreational activities, hobbies, and the like. The data provided in the user profile may be used along with data mining, i.e. technique for selecting contact information for a small segment of the population from a large database of contact information, to learn more about the user and target the user for, for example, print, email and/or direct-mail advertising.

Portlets are visible active components users of the portal see within the portal page. Similar to a window in a PC desktop, each portlet is allocated a portion of the client screen where the relevant information is displayed. A portlet can be generated by a computer program, written for example in Java™, to provide the content to be embedded into portal pages viewed by the user. From a user's perspective, a portlet is a content channel or application to which the user can subscribe. The user can customize the portal page, to show information, which is of interest to the user. From a content provider's view, a portlet is a means to make their content available to a user of the portal. From a portal administrator's view, a portlet is a content container that can be registered with the portal, so that users may subscribe to portal. From the portal's point of view, a portlet is a component rendered to the portal page.

Particular uses and aspects of computer network environments including web pages, clients, servers portals, portlets and the like are discussed in commonly assigned U.S. patent application Ser. No. 10/464,910 filed on Jun. 19, 2003, entitled METHODS, SYSTEMS AND COMPUTER PROGRAM PRODUCTS FOR PORTLET AGGREGATION BY CLIENT APPLICATIONS ON A CLIENT SIDE OF A CLIENT/SERVER ENVIRONMENT, and U.S. patent application Ser. No. 10/838,837 filed May 4, 2004, entitled METHODS, SYSTEMS AND COMPUTER PROGRAM PRODUCTS FOR CLIENT SIDE PREFETCHING AND CACHING OF PORTLETS, the disclosures of which are incorporated herein by reference as if set forth herein in their entirety.

Due to the nature of HTML and how it is parsed, web applications running on servers are typically designed to deliver, to a client or web browser, a file that is merely a display of the current state of a more complex back-end application running on the server. In particular, the delivered file is merely a mix of the data that the developer wishes to display and the way it should be displayed at the client, as well as other more control-oriented tasks, such as switching to a different task, submitting data requests, changing the current view and the like. In other words, none of the distinct portions of data, view and control are separated in the delivered file to the client. However, these distinct portions are clearly separated on the server side. The separation of the distinct aspects of the file will be referred to herein as the "Model, View and Controller (MVC)" portions (markup portions) and the data portions.

It will be understood that although embodiments of the present invention are discussed herein as separating markup and data portions, embodiments of the present invention are not limited to this configuration. In particular, the markup portion may be further separated into components so that the client can request additional user interface components (including both data portions and markup portions) without requesting an entire page. For example, a MENU control with many menu items may be provided. Each menu item may have an associated segment of HTML code. Downloading each of the menu items one at a time may cause long waiting times. Thus, according to some embodiments of the present invention, the menu items may only be downloaded on demand, which may involve incremental downloads of markup segments coupled with data.

For the purposes of background, the MVC paradigm is a way of breaking an application, or even just a piece of an application's interface, into three parts: the model, the view, and the controller. MVC was originally developed to map the traditional input, processing and output roles into the graphical user interface (GUI) realm. For example, Input (controller)→Processing (Model)→Output (View). Thus, the user input, the modeling of the external world, and the visual feedback to the user may be separated and handled by model, viewport and controller objects. The controller may, for example, interpret mouse and keyboard inputs from the user and map these user actions into commands that may be sent to the model and/or viewport to effect the appropriate change. The model may manage one or more data elements, respond to queries about its state, and respond to instructions to change state. The viewport may manage a rectangular area of the display and may be responsible for presenting data to the user through a combination of graphics and text.

The model may be used to manage information and notify observers when that information changes. It typically contains data and functionality that are related by a common purpose. Thus, for example, two separate models may be created for two groups of unrelated data and functionality. A model may encapsulate more than just data and functions that operate on it. A model may serve as a computational approximation or abstraction of some real world process or system. It may capture both the state of a process or system, but how the system works.

The view or viewport may be responsible for mapping graphics onto a device. A viewport typically has a one to one correspondence with a display surface and knows how to render to it. A viewport attaches to a model and renders its content to the display surface. In addition, when the model changes, the viewport may automatically redraw the affected part of the image to reflect those changes. Multiple viewports may be present on the same model and each of these viewports can render the content of the model to a different display surface. In some embodiments, a viewport may be a composite viewport containing several sub-views, which may themselves contain several sub-views.

A controller may be the means by which the user interacts with the application. A controller typically accepts input from the user and instructs the model and viewport to perform actions based on that input. In effect, the controller may be responsible for mapping end-user action, for example, a mouse click, to application response. For example, if the user clicks the mouse button or chooses a menu item, the controller may be responsible for determining how the application should respond.

As will be understood by those having skill in the art, keeping the MVC portions and the data portions separated so as to allow, for example, separate development and manipulation of these portions may be very useful for developers. However, as discussed above, presently, the MVC and data portions are only separated on the server side. Thus, the file currently delivered to the client is a flattened file containing both markup portions, for presentation and control, and actual data portions that are not physically separated. This type of file delivery, although convenient and widely adopted, may not allow for growth of the role of the client in the application. Thus, servers may be even more burdened and network bandwidth may be over used as the complexity of web applications continues to increase.

Accordingly, as will be discussed herein with respect to FIGS. 1 through 9, some embodiments of the present invention provide methods, systems and computer program products for communicating between the server and the client where the file delivered to the client, from the server, maintains the conceptual separation between the MVC portions and the data portions. The MVC portions are referred to collectively herein as the "markup portions." Maintaining the conceptual separation between the MVC portions and the data portions may allow the client to play a much larger role in the processing and control of the web-application. Furthermore, the number of interactions between the client and server may also be reduced, therefore, reducing the overall network bandwidth consumed by the web application. It will be understood that although embodiments of the present invention are discussed herein with respect to web-applications, embodiments of the present invention should not be limited to this configuration.

Furthermore, maintaining the separation between the markup portions and the data portions at the client may allow the data to be cached differently and served differently, which may provide a much more dynamic platform for application deployment. This dynamic platform may allow the data to be encapsulated, cached and served from different server(s), edge servers or webservices, with different refresh rates and cache expirations.

In particular, current "web browsers" or "browsers", such as Internet Explorer 5.5 and later, Netscape 6 and later and Mozilla 1.x, support rich-client features, such as advanced use of JavaScript for programming client-side interactions across objects in an Hypertext Markup Language (HTML) document. However, typically existing web applications are developed using the thin-client computing model. In other words, application servers are typically programmed to dynamically generate and send HTML pages to the user through the web browser.

Developers successfully used the thin-client computing model to lower the cost of creating and distributing applications. However, this model may have several shortcomings. For example, most of the resources used in this model exist at the server, and the user interaction with the application is at the page level for accessing resources. Thus, the system responds to a user's request in a request-response page rendering approach, i.e., page by page, rather than at the HTML component level. This generally means that several interactions (roundtrips) between the web browser (client) and application server (server) may be needed to access resources. This large-scale system reply may be inefficient for many classes of applications where a user's interaction may warrant an immediate response. Other limitations of the thin-client computing model may include a lack of richness in application content and user interfaces. The quality of a user's experience with some web applications may suffer due to a limited sophistication of the solutions built and delivered using the thin-client computing model.

Some modern browsers have implemented the W3C document object model (DOM) using JavaScript client-side scripting. As a result, Web application designers may now be able to build powerful user interfaces (UIs) that let users manipulate data very quickly on the client browser. Abstractly, when a user accesses a rich-client Web application, an application is downloaded that may contain an interactive UI, business logic, and a data set to the browser for virtually immediate user interaction. Common operations for HTML tables containing information from the data set, such as sorting, paging, and filtering, can be executed on the client browser. Having a well-defined document object model (DOM) implemented in JavaScript within the browser, web application designers can build JavaScript code to access and control elements of a web page and the attributes of the elements. Prior to the development of the modern browser, web application UI designs were largely restricted to page-level interactions. Today, designers can create UIs that support element-level interactivity.

Thus, as will be discussed below with respect to FIGS. 1 through 9, utilizing the new capabilities of the modern browsers, some embodiments of the present invention provide a JavaScript technology-based software development structure that can be used to create rich-client web applications. Rich-client designs can be created to enhance a user's efficiency when working with web applications that involve significant data manipulation. Some embodiments of the present invention include an object model for interactive client applications and provide support for creating events and event handlers as will be discussed further below.

A data model, according to some embodiments of the present invention, may be shared with other controls on the web page, and it can be used on the client to store complex object data for reuse across or within an application. Shared data models may improve application performance by reducing the number of requests (from the client) made to servers (roundtrips) and the amount of data transmitted before a user can begin working. Furthermore, reducing the number of round trips may reduce the overall amount of network bandwidth consumed, thus, freeing up bandwidth for other purposes. It will be understood that some embodiments of the present invention are provided in WebSphere Studio Application Developer 5.1.2 offered by International Business Machines of Armonk, N.Y.

Some embodiments of the present invention will now be discussed with respect to FIGS. 1 through 9. Referring now to FIG. 1, an exemplary embodiment of a computing device, for example, a client, a server or the like or data processing system 130 configured in accordance with some embodiments of the present invention will be discussed. The data processing system 130, which may be incorporated in, for example, a personal computer, a PDA, a wireless terminal/phone, or the like, may include a user interface 144, including, for example, input device(s) such as a keyboard or keypad, a display, a speaker and/or microphone, and a memory 136 that communicate with a processor 138. The data processing system 130 may further include an I/O data port(s) 146 that also communicates with the processor 138. The I/O data ports 146 can be used to transfer information between the data processing system 130 and another computer system or a network using, for example, an Internet Protocol (IP) connection. These components may be conventional components such as those used in many conventional data processing systems, which may be configured to operate as described herein.

Figure 2:
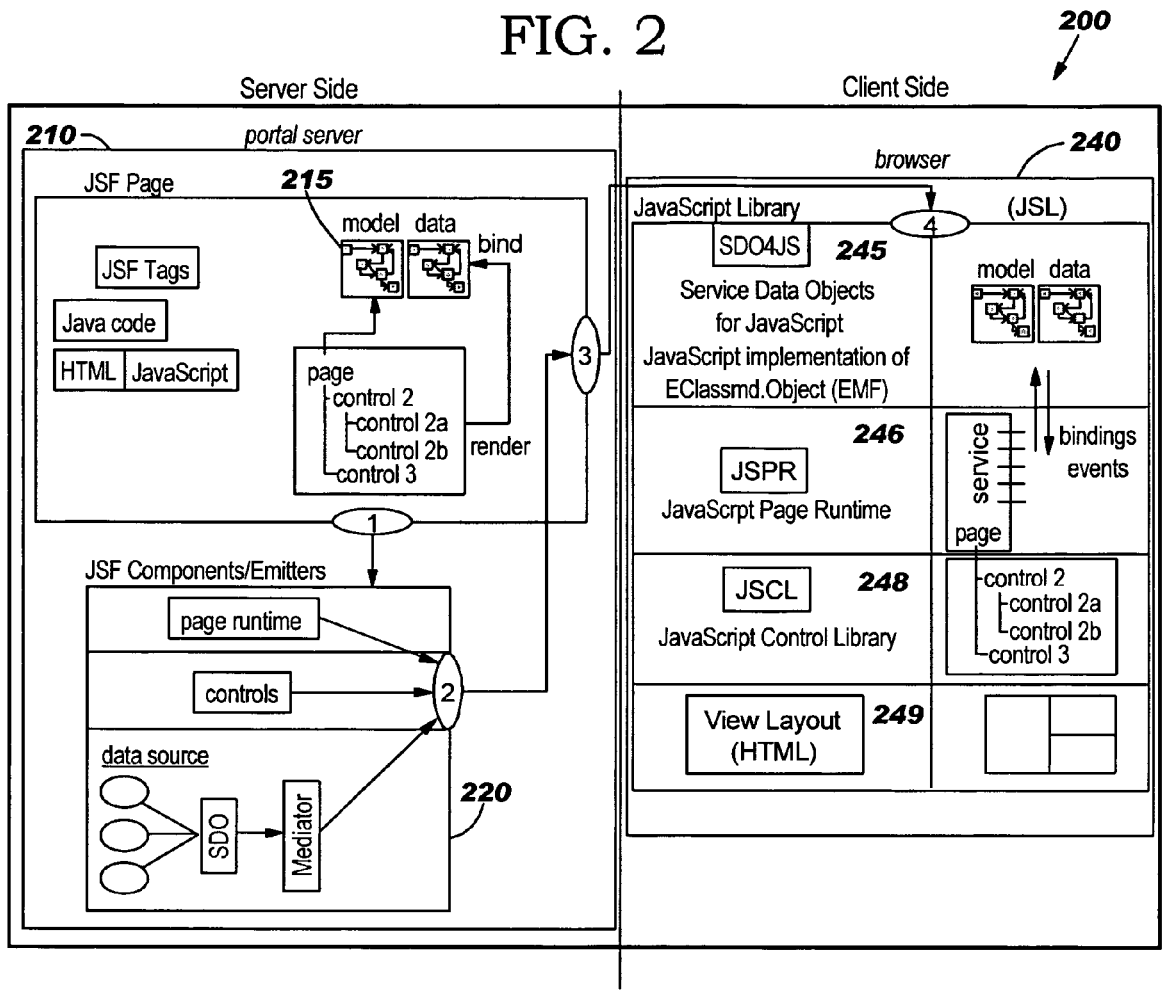
FIG. 2 is a block diagram of a system including a server and client according to some embodiments of the present invention.

Referring now to FIG. 2, a block diagram of a system including a server and client according to some embodiments of the present invention will be discussed. It will be understood that each of the blocks of the system 200 may include one or more of the elements discussed above with respect to FIG. 1, for example, I/O Data ports 146, a processor 138, a memory 136 and a user interface 144. It will be further understood that client, servers and the like are well known to those having skill in the art and, thus, only details relevant to embodiments of the present invention will be discussed in detail herein.

As illustrated in FIG. 2, the system 200 includes a server 210 and a client 240 according to some embodiments of the present invention. Servers 210 according to some embodiments of the present invention are configured to create an MVC model in the browser. A programming model 300 that may be used according to some embodiments of the present invention to create the MVC model in the browser is provided in FIG. 3.

Figure 3:
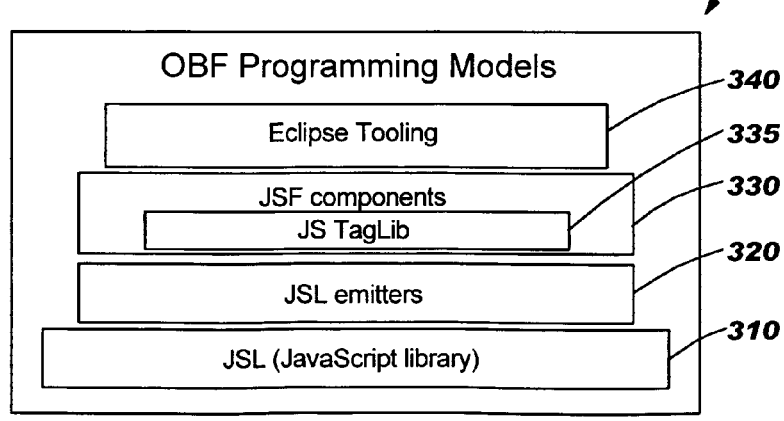
FIG. 3 is a block diagram of a programming model according to some embodiments of the present invention.

Referring now to FIG. 3, a block diagram of a programming model according to some embodiments of the present invention will be discussed. As illustrated in FIG. 3, the programming model 300 may include a JavaScript Library (JSL) 310, JSL Emitters 320, JSL Components 330 including JSL TagLib 335 and Eclipse tooling 340. In particular, the JSL 310 serves as a foundation for the programming model according to some embodiments of the present invention. The JSL contains a set of user interface (UI) control widgets, for example, data grids, tabbed panels, trees and the like, to dynamically bind data models on a page, for example, page 210 of FIG. 2. In some embodiments of the present invention, the JSL may include JavaScript versions of the Eclipse Modeling Framework (EMF) core classes. Details with respect to EMF are provided at world wide web address eclipse.org/emf, the contents of which are incorporated herein by reference as if set forth in its entirety.

The JSL emitter layer 320 may include a Java-based library of helper classes used to create portlet and/or servlet pages according to some embodiments of the present invention. In other words, the JSL emitter layer 320 of the programming model 300 represents a Java™ language-based library of helper classes that emit JSL code onto a page. The emitters 320 write JSL code onto the portlet and/or servlet pages. Thus, the emitter layer 320 may enable the use of Java code to build complex pages that use the JSL.

The JSL Component layer 330, according to some embodiments of the present invention, may be based on the emerging standard called JSR 127. The JSL Component Layer 330 includes a JavaServer Pages (JSP) custom tag library (JSP TagLib) 335 that may be used for expressing an interface with a JSP page according to some embodiments of the present invention. The JSL emitter layer 320 maps one to one with the JSP TagLib 335. The Eclipse tooling layer 340 (visual tooling) represents the last layer in the programming model.

Referring again to FIG. 2, as illustrated, the server (portal server) 210 includes a page 215 and JSL Components and Emitters 220 according to some embodiments of the present invention. In particular, a developer creates a page artifact 215 according to some embodiments of the present invention. In other words, an MVC model is created including controls, data, events and bindings.

In some embodiments of the present invention, the server 210 receives a request for a particular web page and determines a data set for the requested web page. The server 210 is also configured to create a model for the data set, for example, to create an ECore file that contains a server-side Eclipse Modeling Framework (EMF) model of the determined dataset. The server 210 is further configured to identify the user interface components (controls) for the data model presentation. Finally, the server 210 may establish the event model, which may be used to support the user's interaction with the data model. For example, the event model may be configured to deal with the operations followed when a user clicks on a particular portion of the web page using a mouse.

In particular, the server 210 is configured to provide a data model to a portlet's client side GUI. The data is modeled on the server 210 and the data model and instance data (data set) is routed to the browser 240 where various components are configured to use it for presentation purposes. The server 210 is further configured to identify user interface components (controls) for the data model presentation. The controls manage the graphical and textual representation of the data model, i.e., the view or the look of the application data. Generally, for each identified control, the controls main setting is defined, for example, how many rows to display for each data grid, a tabbed panel's height and width and the like, the client-side event handlers are defined and the data model mapping parameters for each page are defined. The server 210 is also configured to establish the event model, which is used to support the user's interaction with the data model. An "event" as used herein, is an announcement or notification in reaction to a stimulus, for example, a change in the state or user clicking the mouse while viewing a document. Event handlers receive control when the related event occurs. The event handler may be configured to update the data model as needed in response to the user's input. The event handlers and binders according to embodiments of the present invention equate to the controller in the MVC model.

As illustrated in flow 1 of FIG. 2, the page artifact 215 (data set, data model, controls and the like) is provided to the JSL Components and Emitters 220. The JSL components and Emitters 220 may be configured to generate JSL artifacts 220 from the page artifact 215, which will be provided to the browser 240 (client) as illustrated in flow 2 of FIG. 2. In other words, a stream of JavaScript and HTML (and any other items that may be included on the page by the developer) is transmitted to the browser 240. The stream of data may be received at the browser 240 as illustrated by the flow from 3 to 4 in FIG. 2. At the browser, a requested web page may be generated. In particular, the page may contain any or all of the following: service data objects for JavaScript (SDO4JS) 245, the page runtime 246, the JavaScript control library 248 and/or the HTML layout 249. Thus, a web page may be provided at the browser and the components of the file that are used to create the page may be separated into the markup (or MVC) portions and the data portions according to some embodiments of the present invention.

Some embodiments of the present invention use a subsystem called SDO4JS Service Data Objects For JavaScript (SDO4JS), a JavaScript implementation of core Service Data Objects (SDO) classes, from the Eclipse Modeling Framework(EMF) base, such as EPackage, EClass, EObject, EAttribute and EReference. Server side, a developer creates a model, as defined in EMF, for the application data (Epackage) and a transform for the GUI(a Map file) that enables the server 210 to consume Java objects and generate a stream of JavaScript code suitable for SDO4JS. This process may allow a developer to model data on the server 210, stream the data to the browser 240 where it can be used by various page elements, before being streamed back to the server for updates.

Furthermore, controls such as your standard HTML-Form controls such as TreeView, DataGrid, TabbedPanel, DatePicker and GraphDraw are provided as part of the framework as discussed above. These controls are aware of the overall page runtime, which allows them to bind to data, and effectively read and write to that same data. The controls can react to data changes and redraw appropriately. Internal control-level operations can also occur in place, without causing page refreshes, or roundtrips to a server. A classic example is that of the ListView which shows some content, for example, the positions in a portfolio. A typical HTML/JavaScript control will draw the data, and when for instance, the user clicks on a column header to sort the table, a URL is submitted that causes a roundtrip to the server to fetch the next window of data. In contrast, according to some embodiments of the present invention, controls are configured to request only the next batch of data to the data object on the page. Thus, common operations such as sorting, paging, filtering and the like can all be performed at the client 240.

Thus, as discussed above, conventionally, data is streamed directly, in place, with the markup on the web page. So, for instance, a table on a web page that shows you the content of your portfolio has effectively bound the data to the page early on the server, and the web page is nothing more than a stream of text, the page, to the browser. In contrast, according to some embodiments of the present invention, the data is modeled for a client-side graphical user interface GUI and is streamed, as a formal data structure, all the way to the browser 240 (client). Thus, the data can be bound to by controls that understand how to deal with real read/write data. This type of binding is referred to herein as "late binding" instead of early binding.

In particular, some embodiments of the present invention effectively create a model-view-controller (MVC) model inside the page being transmitted from the server 210. Thus, a working data set and a set of controls that dynamically bind to that data can be created. The end user (on the client side) can interact with the working dataset using the controls, and until a roundtrip back to the server is necessary to submit data or complete a transaction, the user may benefit from response times and a freedom to interact with the page.

In addition to increased user satisfaction from more interactive and responsive applications, lower consumption of server-side resources may also be provided according to some embodiments of the present invention. Due to a smaller number of roundtrips and a smaller relative page size, the server infrastructure and bandwidth may be scaled to accommodate more users.

Thus, as discussed above, according to some embodiments of the present invention the data transmitted from the server remains formally structured all the way to the browser (client) so as to allow the data to remain usable at the client in a dynamic fashion. Providing late dynamic binding between controls and data enables a variety of functions, such as automatic sharing of data between applications.

An example of operations according to some embodiments of the present invention will now be discussed with respect to FIGS. 4A and 4B. FIGS. 4A and 4B are screen shots of a graphical user interface (GUI) that may be generated according to some embodiments of the present invention. In particular, FIG. 4A is a screen shot of a GUI for a first banking customer, John. As illustrated in FIG. 4A, the GUI is divided into several sections personal information 410, customer sessions 415, customer search 420, global position 425 and teller 430. As further illustrated in FIG. 4A, the personal information section 410 includes a picture of John, his address, telephone numbers and the like. Each of the other sections also contain subsections, for example, the global position 425 section includes a plurality of tabs, banking, credit card, fund, loan and the like.

John may, for example, enter a branch bank and request that fluids be deposited into one of his banking accounts. The teller may request the page 400 at a teller station or browser. The server associated with the teller station and the bank may, according to some embodiments of the present invention, generate a JavaScript Data stream including a data set, a data model, controls and the like, as discussed above with respect to FIG. 2 that are responsive to the request for the page 400. The browser receives the JavaScript data stream and assembles the page 400 at the client (browser).

Once John's deposit has been processed, a second banking customer, Diane, may approach the same teller and request that fluids be withdrawn from her account. As illustrated in FIG. 4B, Diane's page 400' is divided into the same sections as John's page 400, i.e., personal information 410', customer sessions 415', customer search 420', global position 425' and teller 430'. However, the personal information section 410' now includes a picture of Diane, her address, telephone numbers and the like. Thus, when the teller request the page 400' at a teller station or browser to service Diane's withdrawal request, the request the server receives may only be a request for the data set particular to Diane. The data model, controls and the like are the same for Diane's page 400' as for John's page 400 and, thus, this information does not have to be retransmitted. Thus, according to some embodiments of the present invention, the teller's browser may generate Diane's page 400' after only receiving a data set associated with Diane. Accordingly, only a small portion of the data needed to generate the requested page is requested from the server, which not only decreases the workload of the server, but also decreases the amount of network bandwidth needed to process the request.

It will be understood that the GUIs provided in FIGS. 4A and 4B are provided for exemplary purposes only and, therefore, embodiments of the present invention are not limited to this configuration. Furthermore, although the examples discussed herein relate to a banking GUI, embodiments of the present invention are not limited to banking.

Figure 8:
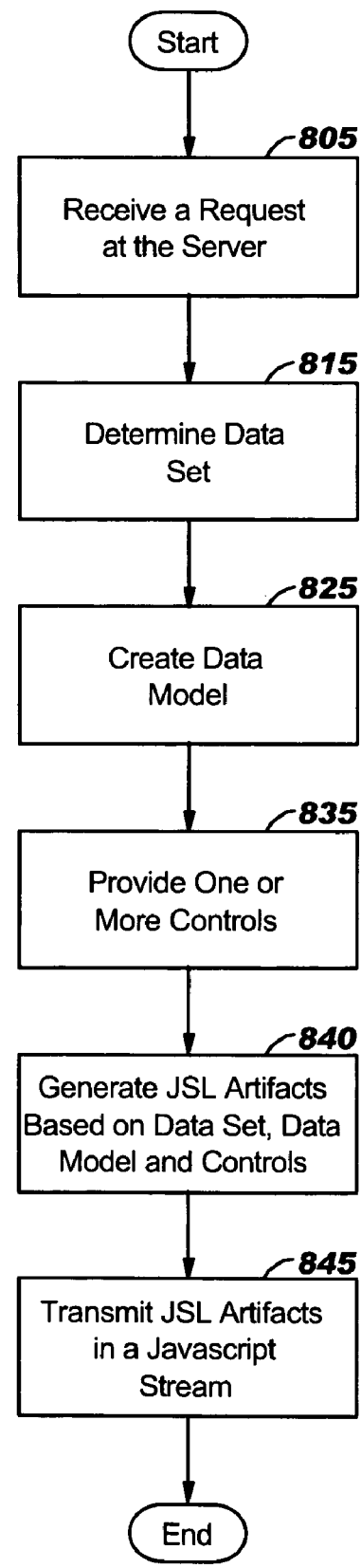
Figure 9:
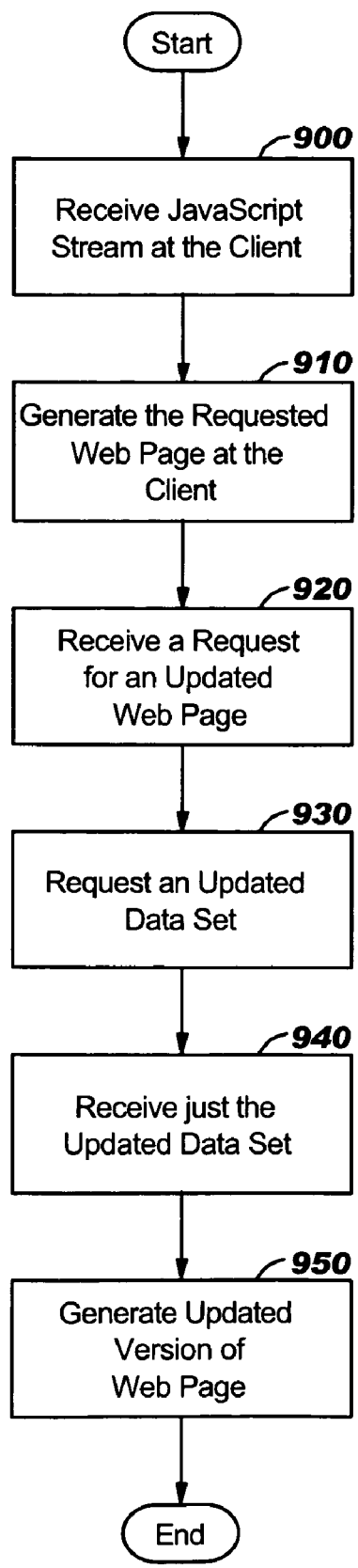

Operations according to various embodiments of the present invention will now be discussed with respect to FIGS. 5 through 9. Referring now to FIG. 9, operations for communicating data between a web application running on a server and a browser running on a client in a network environment will be discussed. Operations begin at block 500 by requesting information, at the client, from the server. In some embodiments of the present invention the server may be, for example, an applications server, the client may be, for example, a web browser and the requested information may be a web page, for example, the web page associate with the bank discussed above with respect to FIGS. 4A and 4B. The requested information, for example, the web page, may be received at the client such that the requested information is separated into a data portion and a markup portion (block 510). As discussed above, according to embodiments of the present invention, the information is stored at the browser in a MVC (markup) portion and a data portion, which may allow for more dynamic manipulation of the data at the client. Thus, the amount of network bandwidth used during a browser session may be reduced and the some of the burden on the server may be relieved.

Referring now to FIG. 6, operations for communicating data between a web application running on a server and a browser running on a client in a network environment will be discussed. Operations begin at block 600 by requesting information, at the client, from the server. In some embodiments of the present invention the server may be, for example, an applications server, the client may be, for example, a web browser and the requested information may be a web page, for example, the web page associate with the bank discussed above with respect to FIGS. 4A and 4B. The requested information, for example, the web page, may be received at the client such that the requested information is separated into a data portion and a markup portion (block 610).

A view of the requested information may be generated at the client, for example, on the browser, based on the received information without any further interaction from the server (block 620). Thus, according to some embodiments of the present invention, the information transmitted from the server to the client includes a data set, a data model, controls bound to the data and the like, thus, the client receives all the information necessary to construct the web page without requesting any further information from the server. Furthermore, during a browser session, a updated view of the web page (information) may be requested at the client (block 630). The client may request only the data portion necessary to provided the updated view from the server. An updated version of the data portion of the information may be received at the client without receiving an updated version of the markup portion of the information (block 640). Thus, only the data portion of the information is provided, as the remaining markup portion has already been received and has been separately stored and maintained at the client. An updated view of the web page may be generated at the client based on the updated version of the data portion of the information (block 650). Thus, according to some embodiments of the present invention, the amount of network bandwidth used during a browser session may be reduced and the some of the burden on the server may be relieved.

Figure 7:
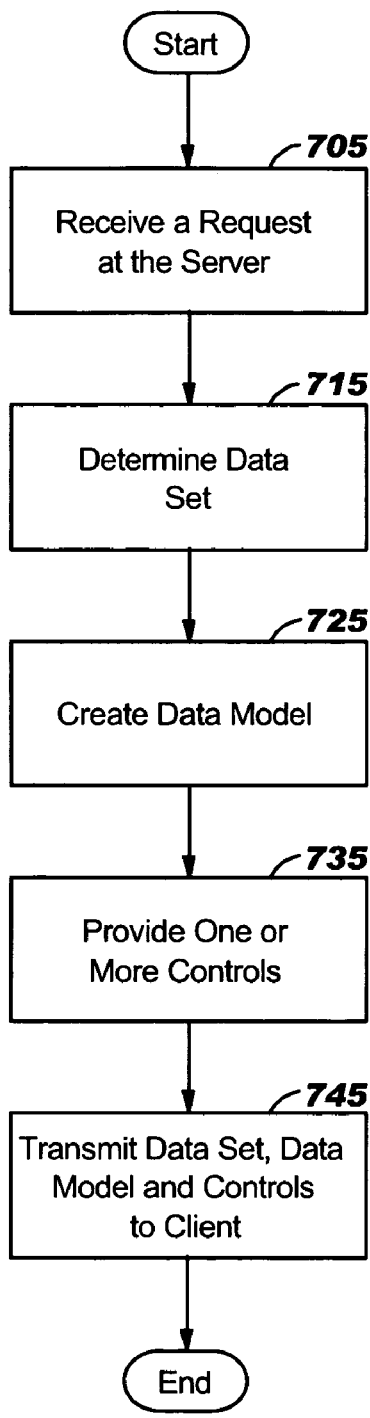

Referring now to FIG. 7, operations for transmitting a web page from a server to a client according to some embodiments of the present invention will be discussed. Operations begin at block 705 by receiving, at the server, a request for a web page from the client or browser. A data set is determined at the server responsive to the request for the web page (block 715). The data set includes raw data to be included on the requested web page at the client that is associated with the requested web page. A data model is determined for the data set at the server (block 725). One or more controls are provided that are associated with the data model, i.e., the controls are bound to the data. The one or more controls provided are used to manage graphical and textual presentation of the data model at the client (browser) (block 735). The data set, the data model and the one or more controls are transmitted to the client (block 745). As discussed above, the data set, data model and one or more controls are kept separate during transmission from the server to the client, so as to allow a view of the requested web page to be generated at the client based on the transmitted data set, data model and one or more controls.

Referring now to the flowchart of FIG. 8, operations for transmitting a web page from a server to a client according to further embodiments of the present invention will be discussed. Operations of blocks 805 to 835 are similar to those discussed with respect to blocks 705 to 735 of FIG. 7 and, therefore, will not be repeated herein. In some embodiments of the present invention, JavaScript library (JSL) artifacts may be generated based on the data set, the data model and the one or more controls before the information is transmitted to the client (block 840). A stream of JavaScript and HTML may be transmitted to the client (block 845). As discussed above, the JSL Components and Emitters are configured to receive the JSL artifacts and generate a stream of JavaScript to be transmitted to the client.

Referring now to FIG. 9, operations for receiving the data stream at the client will be discussed. Operations begin at block 900 by receiving the stream of JavaScript and HTML at the client. The requested web page is generated at the client based on the received stream of JavaScript and HTML (block 910). A request for an updated version of the web page may be received at the client, for example, a user may click a mouse (block 920). An updated data set may be requested from the server responsive to the request for the updated version of the web page (930). It will be understood that only the data portion is requested from the server, as the client has the MVC portion of the page. The updated data set is received without receiving an updated data model or updated one or more controls (block 940). The updated version of the web page may be generated based on the received updated version of the data set at the client (block 950).

Details with respect to various embodiments of the present invention are discussed in *FaceClient Components, Part 1: Portlet programming with FaceClient Components*(http://www-106.ibm.com/developerworks/web/library/wa-facescomp1/), *FaceClient Components, Part 2: Use FaceClient Components in a portal environment* (http://www-106.ibm.com/developerworks/library/wa-facescomp2/), *Consumer self-service, Part 4: Develop and deploy rich clients on the portal* (http://www-106.ibm.com/developerworks/library/i-selfserv4/) and *Face Client Components Developer's Guide* (http://www-106.ibm.com/developerworks/websphere/library/techarticles/0411_hasson/0411_hasson. html), the entire contents of which are incorporated herein as if set forth in their entirety.

As discussed above with respect to FIGS. 1 through 9, according to some embodiments of the present invention, the strength of the JavaScript language and the power of current personal computers may be used to construct, on the client, as extended environment for web applications to run in. In contrast to HTML, JavaScript allows for dynamic behavior on the client. Thus, according to some embodiments of the present invention, data pieces of code may be bound to the markup pieces of code and then transmitted through the web while the separation between the data portion and the markup portions (MVC) is maintained.

The conceptual division that is persisted through to the delivered files may provide the opportunity for granularity of changes, updates and modifications. For example, due to the separation of the data portion from the markup portion, the different portions may be delivered by different mechanisms. Furthermore, the data may be separated out into different files, that may be cached on the client under different cache policies, such that the refresh may be very specific to the data, but all the data elements would be aggregated and used on the same page. In addition, in some embodiments of the present invention, the separate files may be delivered by different servers. Accordingly, methods, systems and computer program products according to some embodiments of the present invention may reduce the data processing loads of servers in networked computer environments by enabling the client to process some of the data. Furthermore, providing an MVC structure at the client may also reduce the amount of network bandwidth used by the web application, as the client may not request as much information from the server during a browser session.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of communicating data between a web application running on a server and a browser running on a client in a network environment, comprising:

requesting information, at the client, from the server;

receiving the requested information at the client, the requested information being separated into a data portion and a markup portion, wherein the markup portion defines presentation and control of the data portion;

refreshing the data portion and the markup portion in cache in the client at different refresh rates according to different cache policies for the data portion and the markup portion;

updating the markup portion at the client to create an updated markup portion;

generating a view of the requested information at the client based on the received information and the updated markup portion, the generated view comprising a web page;

receiving, from the server, an updated version of the data portion of the information at the client without receiving any markup portion of the information; and generating an updated view of the web page at the client based on the updated version of the data portion and the updated markup portion of the information, wherein the updated version of the data portion is streamed as a formal data structure from the server to the client and is bound to the updated markup portion at the client, wherein the updated view is a table of the updated version of the data portion and wherein the data portion is sorted in the table by the client after being received from the server.

2. The method of claim 1, further comprising:
caching the data portion and the markup portion in different servers.

3. The method of claim 1, further comprising:
caching the data portion and the markup portion in different webservices.

4. The method of claim 1, further comprising:
caching the data portion and the markup portion in different caches.

5. The method of claim 4, wherein the data portion and the markup portion have different expiration periods.

6. The method of claim 4, wherein each of the different caches, in which the data portion and the markup portion are stored, have a different refresh rate and a different cache expiration from another of the different caches.

7. A method for generating a web page at a client device, comprising:
- the client device receiving, from a server, information associated with the web page responsive to a request for the web page at the client device, the information being separated into a data portion and a markup portion;
- generating a view of the web page at the client device based on the received information;
- receiving, at the client device, a request for an updated version of the web page;
- requesting, at the client device, an updated data portion responsive to the request for the updated version of the web page;
- receiving, from the server, the updated data portion without receiving any markup portion; and
- generating the updated version of the web page at the client device based on the received updated data portion and the markup portion, wherein the updated data portion is streamed as a formal data structure from the server to the client device and is bound to the markup portion at the client device, wherein the updated view is a table of the updated version of the data portion, and wherein the data portion is sorted in the table by the client after being received from the server.

8. The method of claim 7, wherein the received information comprises JavaScript code.

9. The method of claim 7, wherein the markup portion comprises a client-side representation of the model, view and controller elements associated with the server.

10. The method of claim 7, wherein the received information comprises HTML code.

11. A method of communicating data between a web application running on a server and a browser running on a client in a network environment, comprising:
- requesting information, at the client, from the server;
- receiving the requested information at the client, the requested information being separated into a data portion and a markup portion, wherein the markup portion defines presentation and control of the data portion;
- refreshing the data portion and the markup portion in cache in the client at different refresh rates according to different cache policies for the data portion and the markup portion;
- updating the markup portion at the client to create an updated markup portion;
- generating a view of the requested information at the client based on the received information and the updated markup portion, the generated view comprising a web page;
- receiving, from the server, an updated version of the data portion of the information at the client without receiving any markup portion of the information; and
- generating an updated view of the web page at the client based on the updated version of the data portion and the updated markup portion of the information, wherein the updated version of the data portion is streamed as a formal data structure from the server to the client and is bound to the updated markup portion at the client.

* * * * *